W. W. FLINT.
Hinge for Sheet Metal Ware, Boxes, and other Articles.
No. 201,660. Patented March 26, 1878.
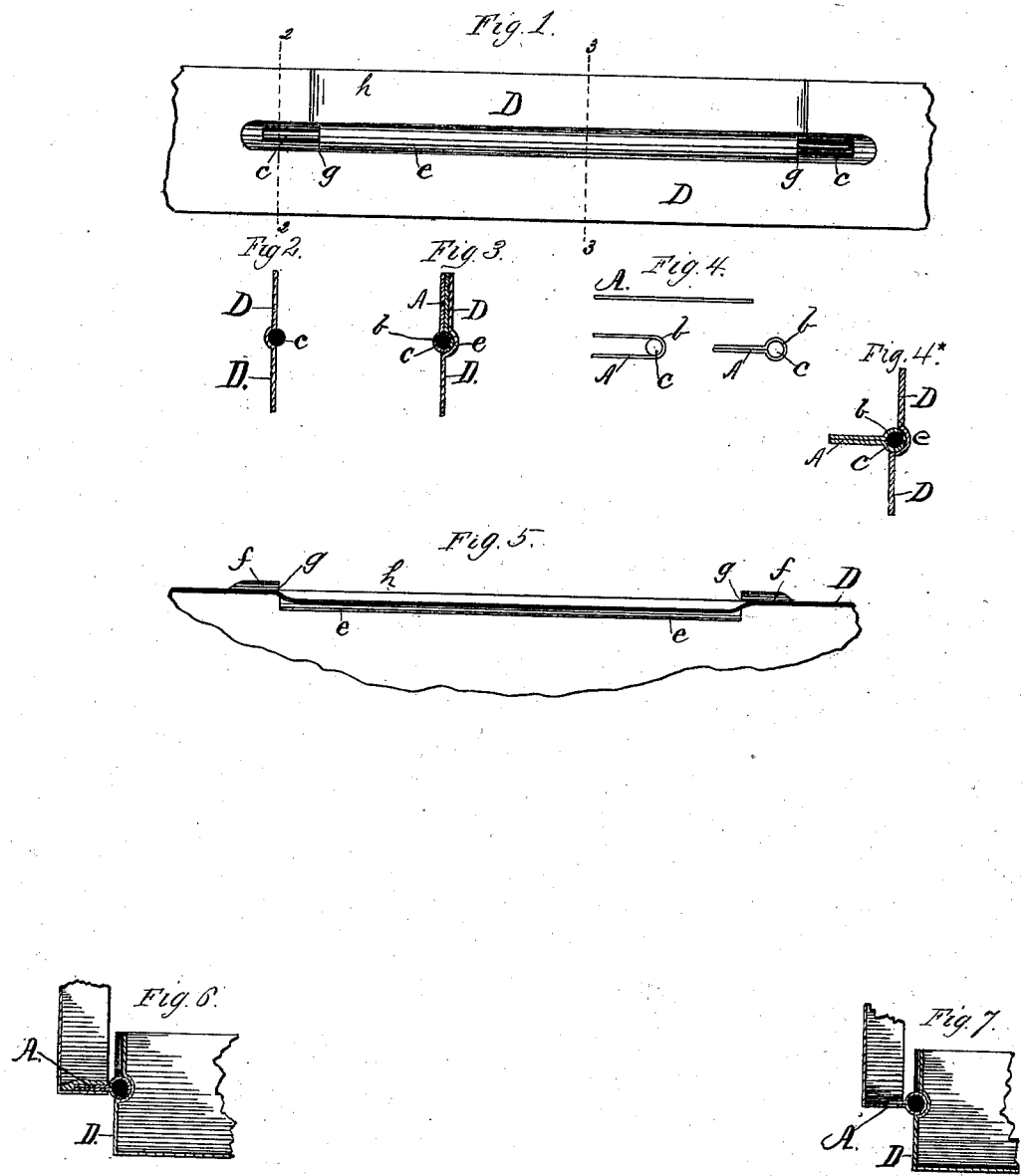

UNITED STATES PATENT OFFICE.

WILLIAM WALLACE FLINT, OF CHICAGO, ILLINOIS, ASSIGNOR TO THE CHICAGO STAMPING COMPANY, OF SAME PLACE.

IMPROVEMENT IN HINGES FOR SHEET-METAL WARE, BOXES, AND OTHER ARTICLES.

Specification forming part of Letters Patent No. 201,660, dated March 26, 1878; application filed February 28, 1878.

*To all whom it may concern:*

Be it known that I, WILLIAM WALLACE FLINT, of Chicago, in the county of Cook and State of Illinois, have invented certain new and useful Improvements in Hinges for Sheet-Metal Ware, Boxes, and other articles; and I do hereby declare that the following is a full, clear, and exact description thereof, which will enable others skilled in the art to which it appertains to make and use the same, reference being had to the accompanying drawings, and to letters of reference marked thereon, which form a part of this specification.

Hinges for metal ware, such as coffee and teapots, urns, boxes, caddies, &c., are usually made of two double pieces, each having one or more tubular parts or eyes, through which their connecting-wire passes, and when applied to the vessel or box a portion of the rim or edge of such vessel or box has to be cut away to admit the hinge.

As an improvement upon this old method, a box recently invented has been made having but one such double piece, and which, instead of hinging upon a similar doubled piece, as usual, is connected directly with the body of the box, the box itself thus taking the place of the omitted half or leaf of the hinge, the connection being effected by cutting out of the body of the box a long slot, adapted to receive the doubled male part of the hinge, and through which doubled part, when so inserted in the slot, the hinging-wire lies, such rod being inside the box, and forming the center or axis, to permit the hinge to open and close.

My present invention is a still further improvement on this last-named construction; and while, like that, it dispenses with one leaf of the hinge, and has all the advantages due to this feature, it consists, mainly, in striking up or corrugating, instead of cutting away or longitudinally slitting, the body of the box to receive the male part of the hinge-piece; and by this means I do not weaken the wall of the box by the removal of any of its material for the purpose of hinging, but, on the contrary, make it, by reason of the corrugation and its seats for the hinging-wire, materially stronger, and better adapted to resist strains than if not so corrugated.

Figure 1 is an elevation of my improved hinge; Fig. 2, a cross-section through line 2 2 of Fig. 1; Fig. 3, a cross-section through line 3 3 of Fig. 1; Fig. 4, a cross-section of the hinge-piece before being folded or doubled, and after being doubled upon its hinging-wire; Fig 4*, a cross-section, the hinge-piece being swung open; Fig. 5, an edge view, looking downward, showing the corrugation on one side of the metal, and the seats for the ends of the wire on the opposite side of the metal; and Fig. 6, a partial vertical section, showing my improved hinge applied to a box and its cover.

A represents the male part of the hinge, made of a flat piece of metal or other suitable material, doubled upon itself, as at $b$, and having within its bend room to admit the hinging wire or rod $c$, which must be long enough to project at both its ends beyond the sides of A.

D represents any piece of metal or other material forming part of, or which may be made a part of, or be applied to, a vessel or box, or other article requiring a hinge. It serves for the female part of the hinge, and is made from a flat piece, and with a longitudinal corrugation, rib, or swell, $e$, adapted to receive the doubled part $b$, and to permit it to be freely turned or rocked therein. Two shorter corrugations, $f f$, swelled or curved in the direction opposite that of the swell $e$, are made in the same line of direction with it, and serve at the proper time as seats to receive the ends of the wire.

At the touching or adjacent points of these seats $f f$ with the corrugation $e$ the metal is broken just enough to separate them from it. The position of these slight fractures is shown at $g g$. In some cases the material may be severed or cut instead of being broken at these points.

Above the corrugation $e$ is a depression, $h$, extending from it upward to the edge of the material. This depression is on the same side with the corrugation, but need not be as deep.

It serves to receive the folded flat part of the hinge-piece when the latter is turned or swung up against it, as in closing the door, lid, or cover to which such hinge-piece is attached, or of which it forms a part.

This depression $h$ and the corrugations $e$ and $ff$ are preferably all made at once by one action of a die, and the same action causes the little transverse breaks or fractures $g\,g$, which are necessarily the result of pressing or corrugating the metal in two opposite directions at the same time at the same point. These fractures are no greater than the transverse section of the corrugations, and each corrugation or swell being about half a small circle, the two adjacent ones not only afford room for the lodgment of the cylindrical wire of the hinge, but the three corrugations jointly co-operate to act like a continuous tube to hold this wire in place, the middle one, $e$, holding the wire against possible displacement in one direction, and the end ones or seats, $f\,f$, holding it against any displacement or escape in the opposite direction, and the rounded outer ends of seats $ff$ arresting it from getting out of place in an endwise direction.

In order to apply the wire to the part D, one end of the wire is inserted in either of the distended fractures $g\,g$ in a slanting direction, and the piece A (if not already upon the wire) may then be put on it, and the wire then brought up so as to lodge the bend $b$ of the hinge-piece in the corrugation $e$, after which that end of the wire which was first put through the fracture may be pushed back endwise until its other end enters the other fracture, and far enough to cause both ends to lodge in their respective seats $ff$. The hinge is then complete and ready for use.

The cheapness, strength, and simplicity of this hinge will be self-evident, for the part A is not cut, reduced, or weakened at any part, and of the part D not a particle has been cut away; and it is not only not weakened by the breaks $g$, but, on the contrary, taking these in connection with the great increase of strength and of resisting-power afforded by the swells $e$ and $f\,f$, this part D is materially stronger than the flat sheet from which it was made.

With a hinge made as above described, a box or other article and its hinged cover may be made of only three pieces—namely, the box or vessel, the cover, and the wired hinge-piece applied to the cover.

As a modification embodying the same improvement, the separate hinge-piece may be dispensed with, but the same kind of hinged connection be made, by making the part A a continuation of and integral with the material out of which the cover is formed, thus making the box or article of two, instead of three, pieces. In such case all soldering, riveting, or fastening of any hinge-piece, is avoided.

The cost of soldering, and of the time and labor it requires, is a considerable percentage of the cost of the article produced; and it will be seen that much, if not all, of such expense may be saved by my improvement, and that, as the corrugations and recess can all be instantly struck up, the hinge can be very quickly, accurately, and cheaply produced.

In Fig. 7 is shown a section of a box and its cover, illustrating this modification of the hinge.

I do not claim the raised seats $f\,f$ adapted to receive a wire, as such have been used before; nor do I claim of itself the recess or depression $h$; but

I claim—

1. The described construction of the side or wall of a metal-ware box and other articles, with the inward ridge or corrugation $e$, the two outward ridges or seats $ff$ at the ends of such inward one, and the transverse breaks or cuts $g\,g$, substantially as and for the purpose shown and described.

2. The wall or side constructed as described, with the inward ridge $e$, the inward depression $h$ above the same, and the two outward ridges or seats $f\,f$, substantially as shown, and for the purposes set forth.

3. The wall or side constructed with the inward ridge or corrugation $e$, the depression $h$, the two outward ridges or seats $ff$, and the wire $c$, lodged in such corrugation and seats, and connecting the same to the female part A of the hinge, substantially as shown and described.

WILLIAM WALLACE FLINT.

Witnesses:
E. MORGAN, Jr.,
H. S. SLAYMAKER.